United States Patent
Merkel et al.

(10) Patent No.: US 8,594,878 B2
(45) Date of Patent: Nov. 26, 2013

(54) METHOD FOR CONTROLLING AN ELECTRIC MOTOR

(75) Inventors: Tino Merkel, Schwieberdingen (DE); Markus Kretschmer, Murr (DE); Gunther Goetting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/513,903

(22) PCT Filed: Oct. 21, 2010

(86) PCT No.: PCT/EP2010/065849
§ 371 (c)(1),
(2), (4) Date: Aug. 10, 2012

(87) PCT Pub. No.: WO2011/082851
PCT Pub. Date: Jul. 14, 2011

(65) Prior Publication Data
US 2012/0323424 A1 Dec. 20, 2012

(30) Foreign Application Priority Data

Dec. 14, 2009 (DE) .......................... 10 2009 054 603

(51) Int. Cl.
*B60L 9/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| 4,766,967 A | 8/1988 | Slicker et al. |
| 5,030,866 A * | 7/1991 | Kawai .............................. 310/82 |
| 5,534,764 A | 7/1996 | Masaki et al. |
| 5,610,483 A | 3/1997 | Obara et al. |
| 5,834,912 A | 11/1998 | Nakamura et al. |
| 7,290,633 B2 * | 11/2007 | Kasten et al. ................. 180/248 |
| 2009/0230824 A1 * | 9/2009 | Hornberger et al. ........ 310/68 B |

FOREIGN PATENT DOCUMENTS

| DE | 4122391 | 1/1993 |
| EP | 0514847 | 11/1992 |
| EP | 1926204 | 5/2008 |
| JP | 62-178105 | 8/1987 |
| JP | 7-264712 | 10/1995 |
| JP | 8-51788 | 2/1996 |
| JP | 2003-088152 | 3/2003 |

OTHER PUBLICATIONS

International Search Report, PCT International Application No. PCT/EP2010/065849, dated May 19, 2011.

\* cited by examiner

*Primary Examiner* — Mary Cheung
*Assistant Examiner* — Anne M. Mazzara
(74) *Attorney, Agent, or Firm* — Kenyon & Kenyon LLP

(57) ABSTRACT

A method for controlling an electric motor for driving a motor vehicle with the aid of a drive train, including: measuring the rotation angle of a rotor of the electric motor multiple times, ascertaining the angular velocity and/or the angular acceleration of the rotor as a function of the detected rotation angle, controlling and/or regulating the energization of electromagnets of a stator of the electric motor, the physical behavior of the electric motor and/or the drive train and/or the motor vehicle detected in a physical model, and the rotation angle and/or the angular velocity and/or the angular acceleration ascertained from the measured values of the rotation angle of the rotor using the physical model, and the energization of electromagnets of the stator of the electric motor being carried out as a function of the rotation angle and/or the angular velocity and/or the angular acceleration ascertained using the physical model.

15 Claims, 3 Drawing Sheets

METHOD FOR CONTROLLING AN ELECTRIC MOTOR

FIELD OF THE INVENTION

The present invention relates to a method for controlling an electric motor for driving a motor vehicle, and a drive train for a motor vehicle.

BACKGROUND INFORMATION

Electric motors are used for various technical applications. In electric or hybrid vehicles, electric motors are, for example, used for driving the motor vehicle. For energization of electric motors, it is necessary to detect the rotational speed or rotation angle of a rotor of the electric motor. For this purpose, the electric motor is equipped with an appropriate sensor for detecting the rotation angle. The angular velocity and/or the angular acceleration of the rotor may be calculated from the detected rotation angle. Resolvers or digital sensors are used as sensors for detecting the rotation angle. Resolvers are analog measuring devices which induce a voltage which is proportional to the rotation angle of the rotor or the electric motor. In this way, the rotation angle and the angular velocity may be detected very accurately, in particular at low rotational speeds, for example less than 1000 RPM. However, resolvers are susceptible to errors at high rotational speeds, since the evaluation of the analog voltage induced by the rotational motion may become inaccurate. In contrast to that, digital sensors, also known as incremental encoders, output a digital signal which, together with a time function, may be converted into a rotational speed signal. Digital sensors distinguish themselves by a great robustness and are thus particularly well suited for use in electric or hybrid vehicles. However, digital sensors have the disadvantage that in the case of low rotational speeds the number of the measured increments per time unit may be low and therefore only a low degree of accuracy of the detected rotation angle is achieved at low rotational speeds. A high degree of accuracy of the rotation angle measured by the digital sensor is, however, necessary to be able to set the torque for the energization of the electric motor.

A method for operating a speed-variable electric motor, in particular a brushless servomotor, is described in German Patent No. DE 41 22 391 A1. By regulating the motor variables current, position angle and rotational speed, the rotational speed is determined through a filter from the position angle measured with the aid of a position sensor.

SUMMARY

An example method according to the present invention for controlling an electric motor for driving a motor vehicle with the aid of a drive train, includes the steps: measuring the rotation angle of a rotor of the electric motor multiple times, ascertaining the angular velocity and/or the angular acceleration of the rotor as a function of the detected rotation angle, controlling and/or regulating the energization of electromagnets as coils of a stator of the electric motor, the physical behavior, in particular the mechanical behavior, of the electric motor and/or the drive train and/or the motor vehicle being detected in a physical model, in particular a mechanical model, and the rotation angle and/or the angular velocity and/or the angular acceleration being ascertained from the measured values of the rotation angle of the rotor using the physical model, and the energization of electromagnets or coils of the stator of the electric motor being carried out as a function of the rotation angle and/or the angular velocity and/or the angular acceleration ascertained using the physical model.

In a physical model, the physical behavior, in particular the mechanical behavior with regard to a rotational and/or a translational motion, of the electric motor and/or the drive train and/or the motor vehicle is detected. The measured values of the rotation angle of the rotor, in particular in the case of a low rotational speed of the rotor, are checked with the aid of the physical model so that, together with the physical model, the measured values of the rotation angle form the foundation for the ascertained values or the calculated values of the rotation angle and/or the angular velocity and/or the angular acceleration of the rotor of the electric motor. The ascertained or calculated values of the rotation angle and/or the angular velocity and/or the angular acceleration are more closely approximated to the actual values so that the values for the rotation angle and/or the angular velocity and/or the angular acceleration for the rotor are more accurate. The energization of electromagnets of the stator is carried out with the aid of these more accurate values. A resolver or a digital sensor is used as a sensor for detecting the rotation angle. In the case of digital sensors, in particular, major errors occur at low rotational speeds. At low rotational speeds, the low degree of accuracy of the digital sensor may be compensated for with the aid of this physical model, and digital sensors may thus be also used in electric and hybrid vehicles due to their robustness.

In particular, the physical model is a dual-mass oscillator or an electric oscillating circuit having a first mass as an electric motor, a second mass as a motor vehicle, and a torsion bar spring as a drive train between the first mass and the second mass, and/or the angular velocity of a drive wheel is detected and the detected angular velocity of the drive wheel is taken into account in the physical model.

In another specific embodiment, a rotational inertia of the first mass, an equivalent rotational inertia of the second mass, and an equivalent spring stiffness and/or an equivalent damping constant of the torsion bar spring is/are determined for the model. The rotational inertia of the first mass is the rotational inertia of the rotor of the electric motor. The equivalent rotational inertia of the second mass is a fictitious value which is ascertained in such a way that the mass of the motor vehicle, i.e., the mass moment of inertia of the motor vehicle with regard to a translational motion, is converted into a fictitious equivalent rotational inertia of a rotational motion. Those components of the motor vehicle which carry out a rotational motion, in particular the drive wheels, are also taken into account in this equivalent rotational inertia. The equivalent spring stiffness indicates the torsion of the drive train as a function of the torque, and the equivalent damping constant indicates the oscillation-damping behavior of the drive train. The rotational inertia, the equivalent rotational inertia, the equivalent spring stiffness, and the equivalent damping constant are generally known from the structural design of a motor vehicle and may thus be calculated for a motor vehicle.

In an additional specific embodiment, the additional driving resistance of the motor vehicle is taken into account in the physical model. Additional driving resistances may occur during operation of a motor vehicle. For example, driving uphill and downhill or an additional load of the motor vehicle result in additional driving resistances. The latter may also be detected in the physical model by taking them into account. If, for example, the driving resistance increases due to the motor vehicle driving uphill, the equivalent rotational inertia of the second mass in the physical model may be fictitiously temporarily increased as long as the driving uphill continues. And vice versa, the fictitious equivalent rotational inertia may be reduced for this time period if the motor vehicle is driving downhill.

The torque of the electric motor is preferably taken into account. The torque which is applied by the electric motor is known from the control and/or regulation of the electric motor. This torque may also be taken into account in the physical model.

In one variant, the additional driving resistance and/or the equivalent spring stiffness is/are iteratively ascertained indirectly or directly from the measured or ascertained values of the rotation angle of the rotor. The additional driving resistance is a variable which is not structurally predefined in the motor vehicle. By constantly and repeatedly measuring the rotation angle and the variables derived therefrom, i.e., the angular acceleration and the angular velocity of the rotor, the additional driving resistance may be calculated with the aid of the physical model. As a deviation therefrom, the additional driving resistance may also be detected with the aid of sensors, e.g., a sensor for detecting whether the motor vehicle is driving uphill and/or downhill. This additional driving resistance is incorporated into the physical model, thus additionally increasing the degree of accuracy of the calculated values for the rotation angle and/or the angular velocity and/or the angular acceleration, since multiple and additional parameters are obtained in this way. The physical model thus becomes significantly more accurate and may display the actual mechanical conditions better and more accurately.

Advantageously, the torque of the electric motor is used when ascertaining or calculating the additional driving resistance.

In another specific embodiment, the rotational inertia of the first mass and/or the equivalent rotational inertia of the second mass and/or the equivalent spring stiffness and/or the equivalent damping constant of the torsion bar spring is/are used when ascertaining or calculating the additional driving resistance.

In particular, the additional driving resistance results from a load of the motor vehicle and/or from the motor vehicle driving uphill or downhill.

In another embodiment, the additional driving resistance is taken into account when ascertaining the rotation angle and/or the angular velocity and/or the angular acceleration of the rotor from the measured values of the rotation angle for the energization of electromagnets of the stator.

In an additional variant, the energization of electromagnets of the stator is carried out as a function of the additional driving resistance.

In another variant, the additional driving resistance is calculated iteratively using a non-linear system of equations.

In another embodiment, the rotational inertia of the first mass and/or the equivalent rotational inertia of the second mass and/or the equivalent spring stiffness and/or the equivalent damping constant of the torsion bar spring is/are contained in the non-linear system of equations.

An example drive unit according to the present invention, in particular a hybrid drive unit, for a motor vehicle, includes: an electric motor having a sensor for detecting the rotation angle of a rotor of the electric motor, a control unit, preferably an internal combustion engine, a drive train, a method described below being executable.

In particular, the sensor may be a resolver or a digital sensor.

BRIEF DESCRIPTION OF THE DRAWINGS

An exemplary embodiment of the present invention is described in greater detail below with reference to the figures.

DETAILED DESCRIPTION OF EXAMPLE EMBODIMENTS

Figure 1:
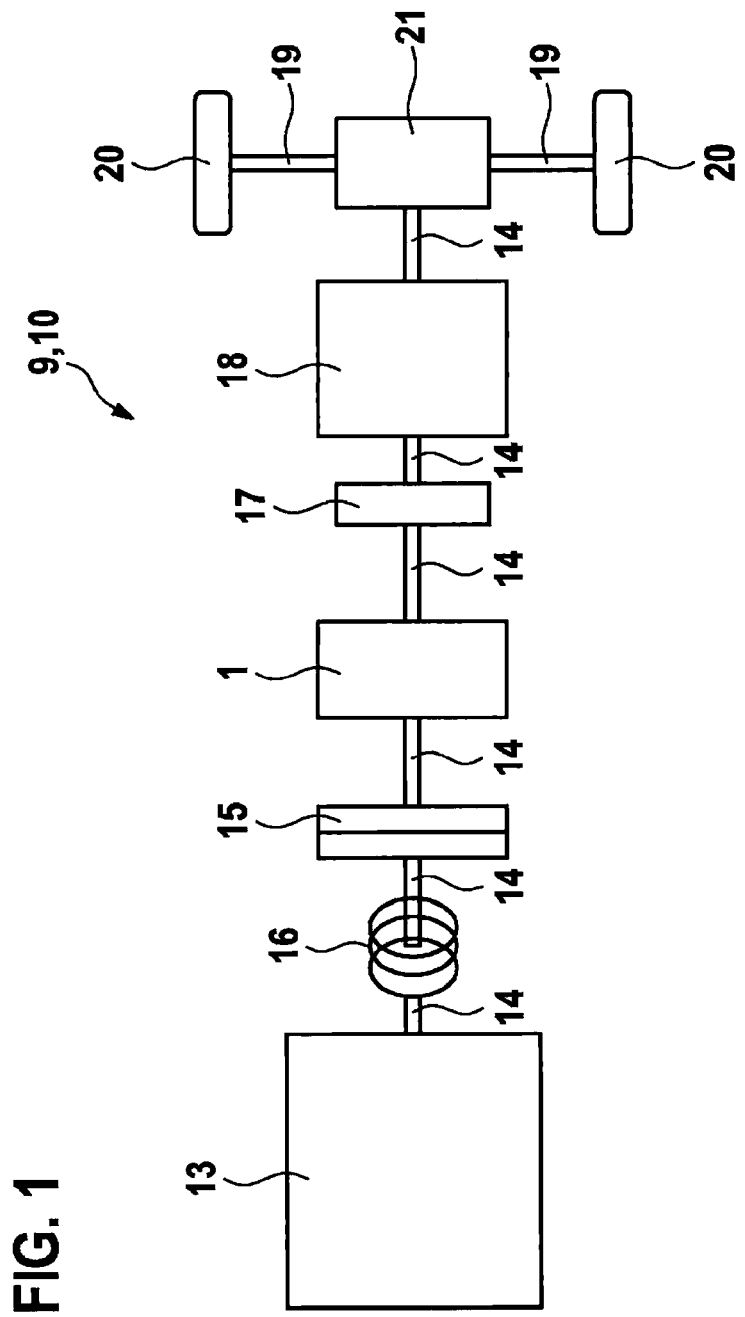
FIG. 1 shows a highly schematic view of a drive unit.

FIG. 1 shows a drive unit 9 for a motor vehicle 11 designed as a hybrid drive unit 10. Hybrid drive unit 10 for motor vehicle 11 includes an internal combustion engine 13 as well as an electric motor 1 for driving motor vehicle 11. Internal combustion engine 13 and electric motor 1 are connected to one another with the aid of a drive shaft 14. Internal combustion engine 13 and electric motor 1 may be mechanically connected and disconnected with the aid of a clutch 15. Furthermore, an elastic element 16 is situated in drive shaft 14 which connects internal combustion engine 13 and electric motor 1 to one another. Electric motor 1 is mechanically connected to a differential 21. In drive shaft 14, which connects electric motor 1 and differential 21 to one another, a converter 17 and a transmission 18 are situated. Drive wheels 20 are driven by half shafts 19 with the aid of differential 21.

Figure 2:
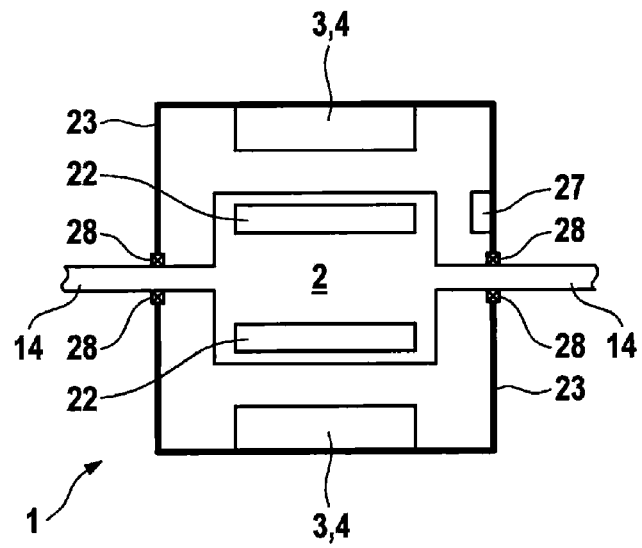
FIG. 2 shows a longitudinal section of an electric motor.

FIG. 2 shows a longitudinal section of electric motor 1. Electric motor 1 has a rotor 2 and a stator 3 having electromagnets 4 as coils 4. Rotor 2 together with drive shaft 14 forms a unit, and permanent magnets 22 are situated on rotor 2. Electromagnets 4 of stator 3 are mounted on a housing 23 of electric motor 1, and housing 23 is mounted on drive shaft 14 with the aid of a mounting support 28. Moreover, electric motor 1 is equipped with a sensor 27, designed as a digital sensor, for detecting the rotation angle of rotor 2 and drive shaft 14. For energization of electromagnets 4 of stator 3, exact knowledge of the rotation angle or the angular velocity of rotor 2 is required. Rotation angle $\phi_E$ of rotor 2 is measured with the aid of sensor 27. At low rotational speeds of rotor 2, the measuring results of sensor 27 are accurate only to a small degree. The values of rotation angle $\phi_E$ measured by sensor 27 are improved with the aid of a physical model described in the following, so that the calculated values of rotation angle $\phi_E$ provide a higher degree of accuracy, and thus a more accurate energization of electromagnets 4 may take place.

Figure 3:
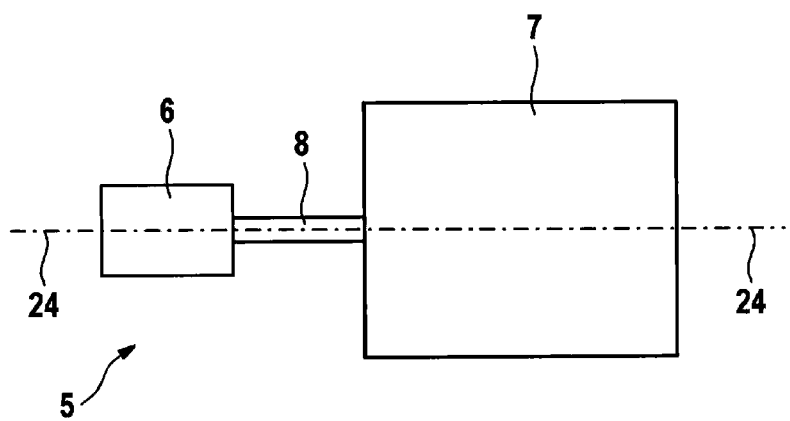
FIG. 3 shows a view of a dual-mass oscillator.

In FIG. 3, a dual-mass oscillator 5 is shown. Dual-mass oscillator 5 is a rotational oscillator whose first mass 6 and second mass 7 fictitiously rotate about an axis of rotation 24. First mass 6 is connected to second mass 7 with the aid of a torsion bar spring 8. Rotational inertia $J_1$ of first mass 6 corresponds to rotational inertia $J_1$ of electric motor 1 or rotor 2 of electric motor 1. In the component of drive unit 9 shown in FIG. 1, drive shaft 14, parts of transmission 18, parts of differential 21, half shaft 19, and drive wheel 20, for example, execute a rotational motion. The rotational inertia of these components is known due to the structural design of motor vehicle 11 and may be calculated. Motor vehicle 11 executes a translational motion, in this case. A mass moment of inertia occurs during a translational motion of the motor vehicle. This mass moment of inertia of the mass of motor vehicle 11 which executes a translational motion is converted into an equivalent rotational inertia $J_2$ of motor vehicle 11. Equivalent rotational inertia $J_2$ of second mass 7 in dual-mass oscillator 5 corresponds in this case to the equivalent inertia, converted from the mass moment of inertia of motor vehicle 11 executing a translational motion, as well as the rotational inertia of the components of drive unit 9 executing a rotational motion, for example drive shaft 14 and half shaft 19.

When applying a torque to drive shaft 14 by electric motor 1, this torque leads to a torsion of components of drive unit 9. In particular, drive shaft 14 and half shaft 19 are twisted in such a way that a lateral delay results between the rotational motion of electric motor 1 and the rotational motion of drive wheels 20. This is taken into account with the aid of equivalent spring stiffness c of the drive train in the physical model. The drive train includes in particular the components of drive unit 9 without electric motor 1 and internal combustion engine 13. In addition, components of the drive train have an oscillation-damping property which is taken into account in the physical model according to dual-mass oscillator 5 in FIG. 3 in the form of equivalent damping constant d. During operation of motor vehicle 11, additional driving resistances F also occur. These may, for example, result when the motor vehicle is driving uphill, or negative driving resistances F may occur when the motor vehicle is driving downhill. An increase in the load of motor vehicle 11 may also lead to additional driving resistances F. These driving resistances F are taken into account in the physical model by way of dual-mass oscillator 5 in that equivalent rotational inertia $J_2$ of second mass 7 is temporarily increased or reduced.

Rotation angle $\phi_E$ of rotor 2 is detected by sensor 27. Furthermore, rotation angle $\phi_F$ of second mass 7 or drive wheel 20 is detected by a not illustrated sensor. In this case, these values are measured very often, e.g., several hundred times within a second, and the measured values are subsequently input into the physical model according to dual-mass oscillator 5. For this purpose, the following equations are used:

$$\alpha_E(t) = c/J_1 * [\phi_E(t) - \phi_F(t)] - d/J_1 * [\omega_E(t) - \omega_F(t)] + 1/J_1 * u(t)$$

$$\alpha_F(t) = c/J_2 * [\phi_E(t) - \phi_F(t)] + d/J_2 * [\omega_E(t) - \omega_F(t)] - F/J_2$$

$$\omega_E(t) = \phi_E'(t); \omega_F(t) = \phi_F'(t)$$

These equations may thus be used to calculate angular acceleration $\alpha_E$ of first mass 6 or rotor 2 and angular acceleration $\alpha_F$ of second mass 7. Here, torque u(t) of electric motor 1 is also taken into account. Torque u(t) of electric motor 1 is made available for energization by the controller of electric motor 1 or may be calculated therefrom. Angular velocity $\omega_E$ of first mass 6 is here time derivative ($\phi_E'(t)$) of rotation angle $\phi_E$ of first mass 6, and angular velocity $\omega_F$ of second mass 7 is here time derivative ($\phi_F'(t)$) of rotation angle $\phi_F$ of second mass 7. This is thus a linear system of equations.

In this non-linear system of equations below, equivalent spring stiffness c=x1 of the drive train and also driving resistance F=x2 of motor vehicle 11 are unknown variables:

$$\alpha E(t) = x1/J1 * [\phi E(t) - \phi F(t)] - d/J1 * [\omega E(t) - \omega F(t)] + 1/J1 * u(t)$$

$$\alpha F(t) = x1/J2 * [\phi E(t) - \phi F(t)] + d/J2 * [\omega E(t) - \omega F(t)] - x2/J2$$

Due to the high number of measurements of rotation angle $\phi_E$ and preferably also of rotation angle $\phi_F$, driving resistance F=$x_2$ and preferably also equivalent spring stiffness c=$x_1$ may be iteratively calculated. As a deviation therefrom, only driving resistance F=$x_2$ may be calculated, and equivalent spring stiffness c, being a known constant and structural variable, is not calculated (not shown in the system of equations above). Due to these constant calculations of driving resistance F and equivalent spring stiffness c, the physical model may be further improved and refined, so that the calculated values for rotation angle $\phi_E$ or angular velocity $\omega_E$ of first mass 6, which corresponds to rotor 2, are further improved in this way.

Values $\phi_E$ for the rotation angle and angular velocity $\omega_E$ of rotor 2 are very accurate, in particular also at a low rotational speed of electric motor 1. In this way, the energization of electromagnets 4 of stator 3 may take place very accurately, although sensor 27 outputs relatively inaccurate results for rotation angle $\phi_E$ of rotor 2. Energization of electromagnets 4 is understood as the current and/or the voltage of the current guided through electromagnets 4 and/or the times of guiding the current through electromagnets 4.

Figure 4:
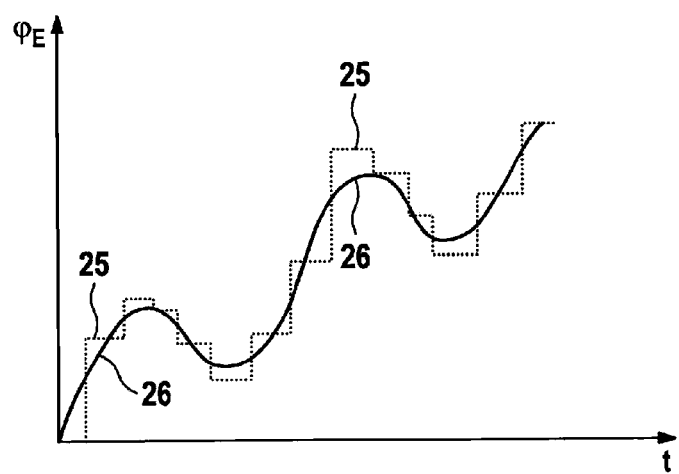
FIG. 4 shows a diagram of the rotation angle of a rotor of the electric motor as a function of time.
Figure 5:
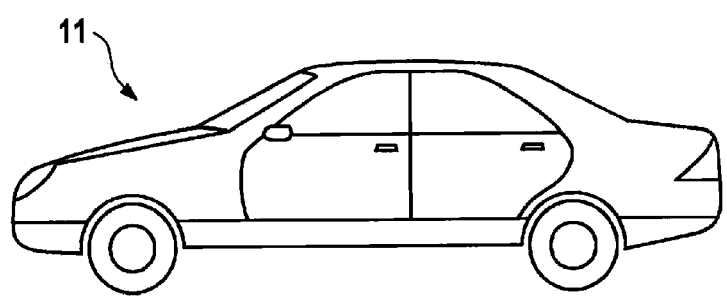
FIG. 5 shows a side view of a motor vehicle.

Rotation angle $\phi_E$ of rotor 2 of electric motor 1 is plotted in a diagram in FIG. 4 as a function of time. The measured values are indicated in curve 25, and the values of rotation angle $\phi_E$ of rotor 2 calculated using the physical model are indicated in curve 26. The calculated values correspond significantly more accurately to the actual values than the measured values.

All in all, considerable advantages are associated with the method according to the present invention for controlling an electric motor 1. Electric motor 1 has a digital sensor as sensor 27 for detecting rotation angle $\phi_E$ of rotor 2. At low rotational speeds of electric motor 1, this sensor 27 only provides measured values with a low degree of accuracy. With the aid of the physical model, these inaccurate measuring results may be processed and refined in such a way that rotation angles $\phi_E$ having a high degree of accuracy are made available from the calculated values for the energization of electric motor 1. Thus, digital sensors, in particular due to their robust properties, may also be used in motor vehicles 11 having a hybrid drive unit 10, without resulting in the energization of electromagnets 4 with a low degree of accuracy at low rotational speeds.

What is claimed is:

1. A method for controlling an electric motor for driving a motor vehicle with the aid of a drive train, comprising:
    measuring a rotation angle of a rotor of the electric motor multiple times;
    detecting a physical behavior of at least one of the electric motor, the drive train, and the motor vehicle, in a physical model;
    ascertaining at least one of an angular velocity and an angular acceleration, of the rotor as a function of the detected rotation angle, at least one of the rotation angle, the angular velocity, and the angular acceleration being ascertained from measured values of the rotation angle of the rotor using the physical model; and
    at least one of controlling and regulating energization of electromagnets of a stator of the electric motor, the energization of electromagnets of the stator of the electric motor being carried out as a function of at least one of the rotation angle, the angular velocity, and the angular acceleration ascertained using the physical model;
    wherein the physical model is a dual-mass oscillator having a first mass as the electric motor, a second mass as the motor vehicle and a torsion bar spring as the drive train between the first mass and the second mass.

2. The method as recited in claim 1, wherein:
    an angular velocity of a drive wheel is detected, and the detected angular velocity of the drive wheel is taken into account in the physical model.

3. The method as recited in claim 2, wherein a rotational inertia of the first mass, an equivalent rotational inertia of the second mass, and an at least one of an equivalent spring stiffness and an equivalent damping constant of the torsion bar spring, are determined for the physical model.

4. The method as recited in claim 3, wherein an additional driving resistance of the motor vehicle is taken into account in the physical model.

5. The method as recited in claim 4, wherein at least one of the additional driving resistance and the equivalent spring stiffness are iteratively ascertained from the ascertained rotation angle of the rotor.

6. The method as recited in claim 5, wherein torque of the electric motor is used when ascertaining the additional driving resistance.

7. The method as recited in claim 5, wherein at least one of the rotational inertia of the first mass, the equivalent rotational inertia of the second mass, the equivalent spring stiffness, and the equivalent damping constant of the torsion bar spring, are used when ascertaining the additional driving resistance.

8. The method as recited in claim 4, wherein the additional driving resistance results from at least one of a load of the motor vehicle, and the motor vehicle driving uphill or downhill.

9. The method as recited in claim 4, wherein the additional driving resistance is taken into account when ascertaining at least one of the rotation angle, the angular velocity, and the angular acceleration of the rotor from the measured values of the rotation angle for the energization of electromagnets of the stator.

10. The method as recited in claim 9, wherein the energization of electromagnets of the stator is carried out as a function of the additional driving resistance.

11. The method as recited in claim 10, wherein the additional driving resistance is calculated iteratively using a non-linear system of equations.

12. The method as recited in claim 11, wherein at least one of the rotational inertia of the first mass, the equivalent rotational inertia of the second mass, the equivalent spring stiffness, and the equivalent damping constant of the torsion bar spring are contained in the non-linear system of equations.

13. The method as recited in claim 1, wherein the torque of the electric motor is taken into account in the physical model.

14. A hybrid drive unit for a motor vehicle, comprising:
an electric motor having a sensor to detect rotation angle of a rotor of the electric motor;
an internal combustion engine;
a drive train driven by at least one of the electric motor and the internal combustion engine; and
a unit to configure and to control the electric motor for driving the motor vehicle with the aid of the drive train, the unit configured to measure a rotation angle of a rotor of the electric motor multiple times, to detect a physical behavior of at least one of the electric motor, the drive train, and the motor vehicle, in a physical model, to ascertain at least one of an angular velocity and an angular acceleration, of the rotor as a function of the detected rotation angle, at least one of the rotation angle, the angular velocity, and the angular acceleration being ascertained from the measured values of the rotation angle of the rotor using the physical model, and at least one of to control and to regulate energization of electromagnets of a stator of the electric motor, the energization of electromagnets of the stator of the electric motor being carried out as a function of at least one of the rotation angle, the angular velocity, and the angular acceleration ascertained using the physical model;
wherein the physical model is a dual-mass oscillator having a first mass as the electric motor, a second mass as the motor vehicle and a torsion bar spring as the drive train between the first mass and the second mass.

15. The drive unit as recited in claim 14, wherein the sensor is one of a resolver or a digital sensor.

\* \* \* \* \*